US007911699B2

United States Patent
Wang et al.

(10) Patent No.: US 7,911,699 B2
(45) Date of Patent: Mar. 22, 2011

(54) OPTICAL DIFFUSER WITH UV BLOCKING COATING

(75) Inventors: Zhong Ming Wang, Ypsilanti, MI (US); Pramod K. Sharma, Ann Arbor, MI (US); Desaraju V. Varaprasad, Ann Arbor, MI (US); Thomas J. Taylor, Northville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 175 days.

(21) Appl. No.: 11/314,735

(22) Filed: Dec. 22, 2005

(65) Prior Publication Data

US 2007/0146889 A1    Jun. 28, 2007

(51) Int. Cl.
*G02B 5/02* (2006.01)

(52) U.S. Cl. ........ 359/599; 359/361; 359/614; 362/355; 362/311.01

(58) Field of Classification Search .......................... None
See application file for complete search history.

(56) References Cited

U.S. PATENT DOCUMENTS

| | | | |
|---|---|---|---|
| 3,058,866 A * | 10/1962 | Rosengren et al. | 216/37 |
| 3,148,300 A | 9/1964 | Graff | |
| 4,792,675 A * | 12/1988 | Laughlin | 250/227.28 |
| 5,196,088 A | 3/1993 | Soda | |
| 5,246,540 A | 9/1993 | Soda | |
| 5,332,618 A | 7/1994 | Austin | |
| 5,371,138 A | 12/1994 | Schaefer et al. | |
| 5,725,957 A | 3/1998 | Varaprasad et al. | |
| 5,940,154 A | 8/1999 | Ukita et al. | |
| 6,275,338 B1 * | 8/2001 | Arai et al. | 359/599 |
| 6,384,526 B1 | 5/2002 | Peters | |
| 6,433,102 B1 | 8/2002 | Suzuki et al. | |
| 6,573,961 B2 | 6/2003 | Jiang et al. | |
| 6,633,722 B1 * | 10/2003 | Minami et al. | 385/146 |
| 6,649,212 B2 | 11/2003 | Payne et al. | |
| 6,747,801 B2 * | 6/2004 | Umemoto et al. | 359/599 |
| 6,924,037 B1 | 8/2005 | Joret et al. | |
| 6,934,080 B2 | 8/2005 | Saccomanno et al. | |
| 6,940,665 B2 | 9/2005 | Cowan et al. | |
| 6,942,906 B2 | 9/2005 | Sakata et al. | |
| 6,943,342 B2 | 9/2005 | Bechtel et al. | |
| 6,952,507 B2 | 10/2005 | Johnson et al. | |
| 6,963,380 B1 | 11/2005 | Kwon et al. | |
| 6,963,445 B2 | 11/2005 | Hoover et al. | |
| 6,963,688 B2 | 11/2005 | Nath | |

(Continued)

FOREIGN PATENT DOCUMENTS

JP        09100460 A   *  4/1997

*Primary Examiner* — Arnel C Lavarias (74) *Attorney, Agent, or Firm* — Nixon & Vanderhye P.C.

(57) ABSTRACT

A diffuser is provided in an illumination system, where the diffuser is capable of blocking significant amounts of ultraviolet (UV) radiation. In certain example embodiments of this invention, the diffuser includes a glass substrate which supports a UV coating(s) that blocks significant amounts of UV radiation thereby reducing the amount of UV radiation which can makes its way through the diffuser. In certain example embodiments, the coating may including particulate so that the coating may both diffuse visible light and perform UV blocking.

6 Claims, 7 Drawing Sheets

U.S. PATENT DOCUMENTS

| | | |
|---|---|---|
| 2003/0146680 A1 | 8/2003 | Wei |
| 2003/0156238 A1* | 8/2003 | Hiraishi et al. ............... 349/112 |
| 2003/0214812 A1 | 11/2003 | Bourdelais et al. |
| 2004/0228141 A1 | 11/2004 | Hay et al. |
| 2005/0105186 A1 | 5/2005 | Kaminsky et al. |
| 2005/0189524 A1 | 9/2005 | Weng et al. |
| 2006/0176429 A1* | 8/2006 | Watchi et al. ................. 349/119 |
| 2007/0108463 A1* | 5/2007 | Chua et al. .................... 257/100 |
| 2007/0153389 A1* | 7/2007 | Sharma et al. ................ 359/599 |
| 2010/0172137 A1* | 7/2010 | Konomoto et al. ........... 362/260 |

* cited by examiner

| Example | Substrate | Silane matrix with D50 by % Wt | Pigment by % Wt | Thickness (μm) | Tvis % | Tuv % | $T_{IR}$ % |
|---|---|---|---|---|---|---|---|
| Example # 1 | Glass | 84 | 16 $TiO_2$ | 3.2 | 72.1 | 0.4 | 44.5 |
| Example # 2 | Glass | 80 | 20 $TiO_2$ | 3.6 | 68.7 | 0.3 | 43.7 |
| Example # 3 | Glass | 76 | 24 $TiO_2$ | 4.3 | 66.2 | 0.4 | 42.6 |
| Example # 4 | Glass | 99.5 | 0.5 $SiO_2$ | 2.1 | 77.4 | 0.8 | 44.6 |
| Example # 5 | Glass | 99 | 1 $SiO_2$ | 2.3 | 75.3 | 0.6 | 44.1 |
| Example # 6 | Glass | 83.5 | 0.5$SiO_2$+ 16 $TiO_2$ | 2.9 | 69.8 | 0.2 | 44.3 |
| Example # 7 | Fluorinated SnO coated glass | 95 | 5 $SiO_2$ | 3.2 | 47.8 | 6.8 | 25.9 |
| Example # 8 | Double silver coated glass | 95 | 5 $SiO_2$ | 3.8 | 42 | 3.8 | 4.7 |

| Example | Substrate | Silane matrix with D50 by % Wt | Pigment by % Wt | Coating | Tuv% |
|---|---|---|---|---|---|
| Example # 9 | Etched Glass | 96 | 4 $TiO_2$ | UV-Coating on the etched side | 2.27 |
| Example # 10 | Etched Glass | 96 | 4 $TiO_2$ | UV-Coating on other side of etched glass | 2.38 |

Fig. 13

OPTICAL DIFFUSER WITH UV BLOCKING COATING

This invention relates to a diffuser for use in optical devices. In certain example embodiments, the diffuser includes both diffusing functionality and a coating for blocking substantial amounts of ultraviolet (UV) radiation.

BACKGROUND OF THE INVENTION

Diffusers are known in the art. Diffusers are for widely scattering and/or spreading light, and are used in many different optical application including but not limited to wrist watches, projection systems, displays, computer screens, surgical equipment, optical communication systems, light sensors, fiber optic systems, microscope illumination systems, light guides, and so forth. Ultraviolet (UV) radiation can damage one or more of the aforesaid devices in which diffusers may be used. However, unfortunately, conventional diffusers do not block sufficient ultraviolet (UV) radiation which can lead to damage in one or more of the aforesaid optical devices.

Accordingly, it has been found that there exists a need in the art for a diffuser that can both function as a diffuser and block significant amounts of UV radiation.

BRIEF SUMMARY OF EXAMPLE EMBODIMENTS OF THE INVENTION

A diffuser is provided in an illumination system, where the diffuser is capable of blocking significant amounts of UV radiation. In certain example embodiments of this invention, the diffuser includes a glass substrate which supports a UV coating(s) that blocks significant amounts of UV radiation thereby reducing the amount of UV radiation which can make its way through the diffuser.

In certain example embodiments of this invention, a diffuser includes a glass substrate which has a UV coating on one side thereof and a diffusing coating on the other side thereof. In another example embodiment of this invention, a diffuser includes a glass substrate including a roughened (e.g., roughened by etching or the like) surface for diffusing light, and a UV coating provided on the glass substrate over the roughened surface. In still further example embodiments of this invention, a diffuser includes a glass substrate including a roughened (e.g., roughened by etching or the like) surface for diffusing light, and a UV coating provided on the major surface of the glass substrate opposite the roughened surface. The UV coating functions to block (absorb and/or reflect) significant amounts of UV radiation.

Diffusers according to certain example embodiments of this invention may be used in an illumination system in any suitable optical application, including but not limited to applications such as wrist watches, projection systems, display backlights, computer screens, surgical equipment, optical communication systems, light sensors, fiber optic systems, microscope illumination systems, and light guides.

In certain example embodiments of this invention, there is provided an illumination system comprising: a light source for emitting light, the light emitted from the diffuser including at least visible light and ultraviolet (UV) radiation; a diffuser positioned so as to receive light from the light source, the diffuser diffusing visible light received from the light source; and wherein the diffuser comprises a glass substrate that supports a UV blocking coating, so that the diffuser has a $T_{UV}$ (UV transmission) of no greater than about 5%.

In other example embodiments of this invention, there is provided a diffuser for use in an optical system, the diffuser diffusing visible light and comprising: a glass substrate that supports a UV blocking coating, so that the diffuser has a $T_{UV}$ (UV transmission) of no greater than about 5%, more preferably no greater than about 2%, and most preferably no greater than about 1%. In certain example embodiments, the UV blocking coating comprises an organic UV blocking material in a silane-based matrix. As an example, the UV blocking material in the matrix may be of or include 2, 2, 4, 4 tetra hydroxyl benzo phenone in certain example embodiments.

DETAILED DESCRIPTION OF EXAMPLE EMBODIMENTS OF THE INVENTION

Referring now more particularly to the figures where like reference numerals indicate like parts throughout the several views.

This invention relates to a diffuser for use in illumination systems for optical devices/systems. A diffuser is provided that both functions as a diffuser and blocks significant amounts of UV radiation. In certain example embodiments of this invention, the diffuser includes a glass substrate which supports a UV coating(s) that blocks significant amounts of UV radiation thereby reducing the amount of UV radiation which can make its way through the diffuser. Because the diffuser blocks significant amounts of UV radiation, the amount of UV radiation making its way through the diffuser and into the active area of the optical device is reduced thereby reducing the amount of potential damage which can be inflicted on the optical device by the UV radiation. For example, UV radiation tends to cause certain materials to degrade thereby reducing the lifespan of one or more of the optical devices mentioned herein.

Diffusers according to certain example embodiments of this invention (see FIGS. 1-5) may be used in any suitable optical application, including but not limited to applications such as wrist watches, projection systems, display (e.g., liquid crystal display) backlights, computer screens, surgical equipment, optical communication systems, light sensors, fiber optic systems, microscope illumination systems, and light guides. In certain example embodiments of this invention, the diffuser is a glass based product that can both block (reflect and/or absorb) significant amounts of UV radiation and provide glare reduction from one or both surfaces. In certain example embodiments, the diffuser may acts as a Lambertian or quasi-Lambertian diffuser.

Plastic diffusers have been known in the art. However, plastic based diffusers may be susceptible to high temperatures (e.g., high operating temperatures) associated with one or more of the aforesaid optical devices. Thus, in certain example non-limiting embodiments of this invention, the diffuser includes a glass substrate which is more durable and can withstand high temperature applications and which does not degrade upon UV exposure.

Figure 1:
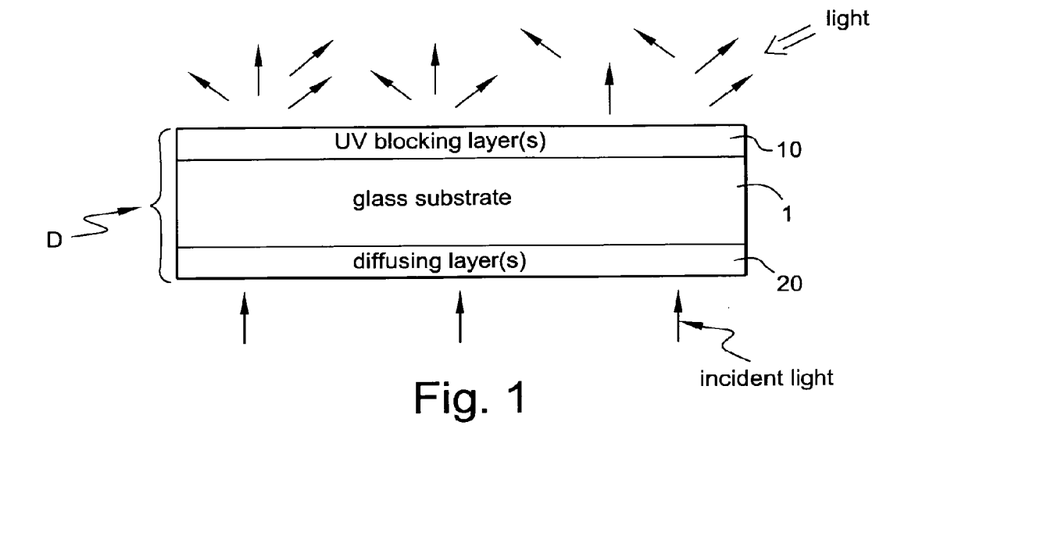
FIG. 1 is a cross sectional view of a diffuser according to an example embodiment of this invention.

FIG. 1 is cross sectional view of a diffuser D according to an example embodiment of this invention. The diffuser D of the FIG. 1 embodiment includes a glass substrate 1, a UV blocking coating 10, and a diffusing coating 20. The glass substrate 1 may be a soda-lime-silica based glass substrate according to certain example embodiments of this invention, and may or may not be heat treated (e.g., thermally tempered). Each of the coatings 10, 20 may include one or more layers in different embodiments of this invention. In the FIG. 1 embodiment, the UV blocking coating 10 functions to block significant amounts of UV radiation that was present in the incident light from the light source(s) of the illumination system, whereas the diffusing coating 20 causes the incident light to substantially spread out or scatter as it moves through the glass substrate 1. Each of the UV blocking coating 10 and the diffusing coating 20 do not block significant amounts of visible rays (e.g., no more than about 10% each, more preferably no more than about 5% each), so that efficiency of transmission of visible radiation is retained and/or maintained by the diffuser. In certain example instances, the diffusing coating 20 may be a coating that includes a frit composition for diffusing purposes, or may be a coating that includes a plurality of particles (e.g., particles of $TiO_2$, $Al_2O_3$, $SiO_2$ and/or the like) suspended in a solution or resin for diffusing visible light. In the FIG. 1 embodiment, the UV coating 10 and the diffusing coating 20 are on opposite major sides of the glass substrate 1.

Figure 2:
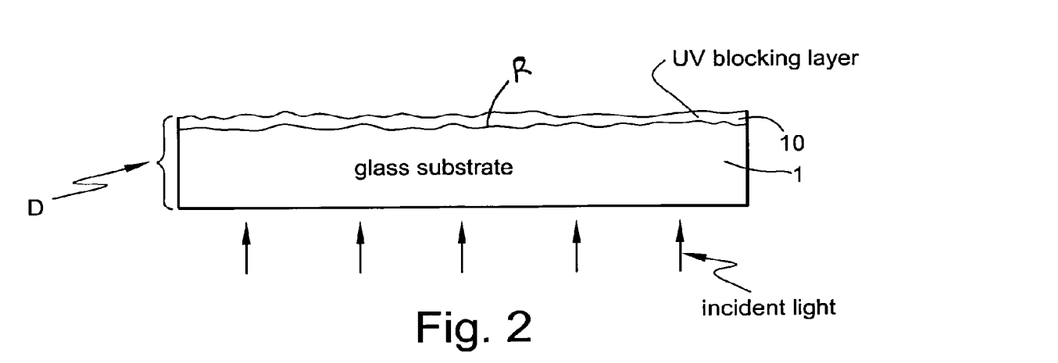
FIG. 2 is a cross sectional view of a diffuser according to another example embodiment of this invention.

FIG. 2 is a cross sectional view of a diffuser D according to another example embodiment of this invention. Like the FIG. 1 embodiment, the diffuser of FIG. 2 includes a glass substrate 1 and a UV blocking coating 10. However, in the FIG. 2 embodiment, at least one major surface of the glass substrate 1 is roughened to provide a light scattering diffusing effect. In the illustrated FIG. 2 embodiment, the surface of the glass substrate 1 under the UV blocking coating 10 has been roughened to provide a roughened surface R for scattering/spreading visible light so that the product can function as a diffuser. The surface roughening of the glass substrate 1 may be performed in any suitable manner, including but not limited to etching of the glass using a hydrofluoric acid based solution (HF-etched glass), sand-blasting of the glass, or any other technique for etching of the glass surface. The incident light is diffused by the roughened surface R due to the differences in indices of refraction along the roughened area between the glass and the overlying coating and air. In this embodiment, the roughened surface R of the glass 1 and/or the coating 10 provides the visible light diffusing function, whereas the UV coating 10 provides the function of blocking significant amounts of UV radiation.

Figure 3:
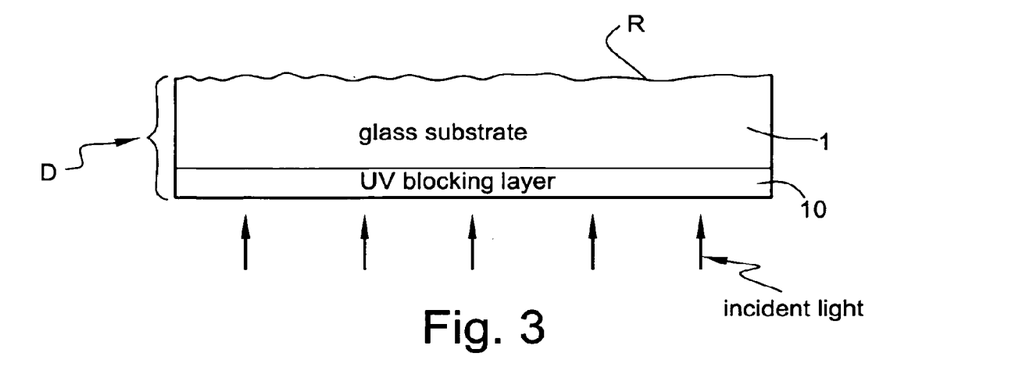
FIG. 3 is a cross sectional view of a diffuser according to yet another example embodiment of this invention.

FIG. 3 is a cross sectional view of a diffuser D according to yet another example embodiment of this invention. Like the FIG. 1 embodiment, the diffuser of FIG. 2 includes a glass substrate 1 and a UV blocking coating 10. However, in the FIG. 3 embodiment, at least one major surface of the glass substrate 1 is roughened to provide a light scattering diffusing effect. In the illustrated FIG. 3 embodiment, the front surface of the glass substrate 1 (i.e., the surface furthest from the light source(s) of the illumination system) has been roughened to provide a roughened surface R for scattering/spreading visible light so that the product can function as a diffuser. The surface roughening of the glass substrate 1 may be performed in any suitable manner, including but not limited to etching of the glass using a hydrofluoric acid based solution (HF-etched glass), sand-blasting of the glass, or any other technique for etching of the glass surface. The incident light is diffused by the roughened surface R due to the differences in indices of refraction along the roughened area between the glass and the overlying coating and air. In this FIG. 3 embodiment, the UV coating 10 is provided on the surface of the glass substrate opposite the roughened surface R. In this embodiment, the roughened surface R of the glass 1 provides the visible light diffusing function, whereas the UV coating 10 provides the function of blocking significant amounts of UV radiation. While the FIG. 3 embodiment illustrates the front surface being roughened and the rear surface of the glass substrate having the UV blocking coating 10 thereon, this invention is not so limited as the positions of the UV blocking coating 10 and the roughened surface R could be reversed in alternative embodiments of this invention. In other words, in alternative embodiments the rear surface of the glass substrate could be roughened and the UV coating 10 could be provided on the front surface of the glass substrate 1. Example 9 relates to the FIG. 2 embodiment, whereas Example 10 relates to the FIG. 3 embodiment (e.g., see FIG. 13).

Figure 5:
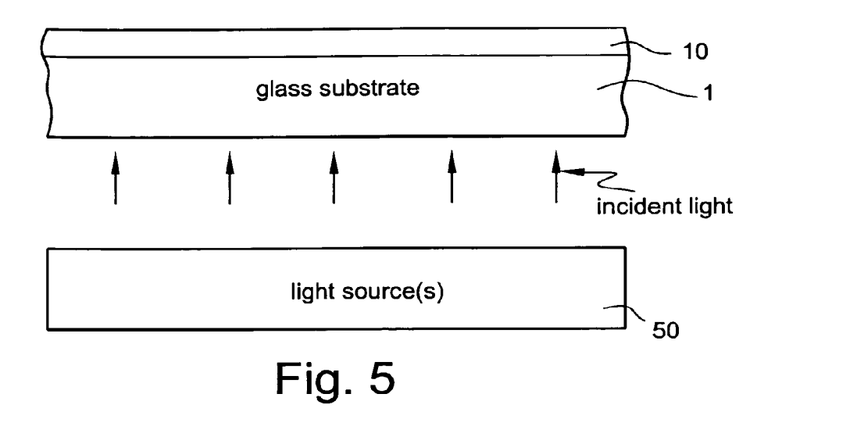
FIG. 5 is a cross sectional view of a diffuser according to another example embodiment of this invention.

FIG. 5 is a cross sectional view of a diffuser D according to still another example embodiment of this invention. In the FIG. 5 embodiment, the coating 10 provides both UV blocking functionality and visible light diffusing functionality. In other words, both the diffusing and UV blocking functions are performed by the same coating 10 in this embodiment. Stated another way, the UV coating 10 in this embodiment has been modified so that the UV coating also acts as a diffuser. This may be achieved by providing filler particulate material(s) such as silica, alumina and/or titania in the UV coating 10 with the filler particulate material acting to reflect and thus spread/scatter visible light rays passing through the coating 10. In certain example instances, particles of one or more of silica, titania, alumina, or zirconia may be mixed with radiation absorbing additives such as UV and/or IR (infrared) blockers in a compatible binder matrix material to render the resultant coating 10 an effective scatterer of visible light and blocker of damaging UV and/or IR radiation. It is also possible to imprint a fine pattern onto a clear coating 10 to cause it to function as a non-glare coating instead of or in addition to a diffusing coating.

Different types of UV blocking/diffusing coating 10 may be used in the FIG. 5 embodiment. Consider the following example types of coating 10 that may be used in conjunction with this embodiment, so as to function in both visible light diffusing and UV blocking manners. First, a coating of or including titania particles in a silane matrix in which D-50 is chemically incorporated may be used as coating 10. Second, a coating of or including zinc oxide particles in a D-50/polyurethanesil matrix may be used as coating 10. Third, a UV coating with no such particles therein may be subject to a fine mechanical imprinting so as to roughen the surface thereof whereby light diffusing and/or non-glare functionality can be achieved by such roughening. Fourth, a coating of or including silica and alumina in a glymo/D-50 matrix may be used as coating 10.

This coating 10 of the FIG. 5 embodiment, which functions as both a diffuser and UV blocker, may be used in conjunction with any of the other embodiments discussed herein in certain example instances (e.g., see FIGS. 1-4).

In certain example embodiments, it is also possible to add fluorescent material(s) to the UV coating 10 of any of the embodiments discussed herein. These may be selected to absorb UV and re-emit visible light, thereby increasing efficiency of the illumination system.

In addition to the example UV blocking coatings 10 discussed above, other possible UV blocking coatings according to alternative example embodiments of this invention will now be discussed. Any of the below-discussed UV blocking coatings may be used for the UV blocking coating 10 in any embodiment of this invention (e.g., see FIGS. 1-5).

UV blocking coating 10 may be, for purposes of example and without limitation, any suitable commercially available UV blocking coating such as a UV blocking coating available from Guardian Industries, Corp., Auburn Hills, Mich., or a silica based UV blocking coating available from Tru-Vue, Inc., Chicago, Ill. UV blocking coating 10 includes at least one layer, and blocks at least some UV radiation. For example and without limitation, any of the coatings described and/or illustrated in any of U.S. Pat. Nos. 5,332,618 or 5,371,138 (both incorporated herein by reference) may also be used as a UV blocking coating 10 in certain embodiments of this invention.

In certain example embodiments of this invention, UV blocking coating 10 prevents at least about 50% of UV radiation (300-380 nm) reaching the same from passing therethrough, more preferably at least about 70%, even more preferably prevents at least about 80% of UV radiation reaching the same from passing therethrough, and most preferably prevents at least about 90% (or at least about 95%) of UV radiation reaching the same from passing therethrough. In other words, UV blocking coating 10 preferably blocks at least about 50% of UV radiation (i.e., from 300-380 nm), more preferably at least about 70% of UV radiation, even more preferably at least about 80%, more preferably at least about 90% of UV radiation, and most preferably at least 95% of UV radiation (e.g., see FIGS. 7-12). UV blocking coating 10 may block UV radiation (from 300-380 nm) by, for example and without limitation, reflecting such UV radiation, absorbing such UV radiation, and/or converting amounts of such UV radiation into other type(s) of radiation (e.g., IR), and/or the like. It is noted that coating 10 is not limited to the precise coatings described above, as any suitable UV blocking coating may be used as coating 10 in different embodiments of this invention. UV blocking coatings 10 according to different embodiments of this invention may be formed in any suitable manner (e.g., via sputter coating, via vapor deposition, via capillary action, via roll(s) coating, and/or the like). In certain example embodiments, the diffuser D has a visible transmission of at least about 40%, more preferably of at least about 60%, even more preferably of at least about 70%, and sometimes at least about 75%.

In certain example embodiments of this invention, the UV blocking coating 10 may be of or include a colloidal electro-conductive oxide solution having both infrared (IR) and ultraviolet (UV) blocking characteristics. In certain example embodiments of this invention, for UV blocking coating 10, a substantially transparent composite oxide coating is provided that includes a silica matrix, zinc antimonite, and a UV blocking material, thereby permitting the coating (e.g., applied via a coating sol) after application to block significant amounts of both IR and UV radiation. In certain example embodiments of this invention, a UV and IR blocking coating comprises each of cerium oxide and zinc antimonite in the form of nanoparticulate, and silicon oxide (e.g., $SiO_2$). It has surprisingly been found that such coatings are effective at blocking both UV and IR radiation, and also are resistant to high temperatures as spectral response remains substantially unchanged in certain example instances after one or two hours of substantial heating (e.g., to about 400 or 450 degrees C.). In certain example embodiments, the coated article has transmission for a wavelength of 2300 nm, of less than 10%. In certain example embodiments of this invention, the sol type coating comprises from about 15 to 50% cerium oxide (more preferably from about 20 to 45%, and most preferably from about 30 to 40%), from about 30 to 70% zinc antimonate (more preferably from about 35 to 65%, and most preferably from about 40 to 55%), and from about 5 to 35% silicon oxide (more preferably from about 10 to 30%, and most preferably from about 12 to 25%). It has been found that these amounts of such materials in the sol type coating provide a coating that is effective at blocking both UV and IR radiation, and is also are resistant to high temperatures. In the case where the colloidal antimony oxide is antimony oxide sol, the method of producing electroconductive anhydrous zinc antimonate inclusive coatings according to certain example embodiments can be produced by, inter alia, mixing antimony oxide sol and a zinc compound, and then calcining the mixture at 300 to 680 degrees C. after drying. The zinc compound which can be used in certain example embodiments is at least one zinc compound selected from the group consisting of zinc hydroxide, zinc oxide, inorganic acid salts of zinc and organic salts of zinc. The inorganic acid salts of zinc include zinc carbonate, basic zinc carbonate, zinc nitrate, zinc chloride, zinc sulfate and the like. The organic acid salts of zinc include zinc formate, zinc acetate, zinc oxalate and the like. These zinc compounds may be those put on the market as industrial chemicals. When zinc hydroxide and zinc oxide are used, it is preferred that they have a primary particle diameter of 100 nm or less. In particular, the salts containing acids that vaporize upon calcination, for example, carbonate salts and organic acid salts, are preferred. They may be used alone or as admixtures of two or more of them. The colloidal antimony oxide which can be used is antimony oxide having a primary particle diameter of 100 nm or less and includes diantimony pentoxide sol, hexaantimony tridecaoxide sol, diantimony tetroxide hydrate sol, colloidal diantimony trioxide and the like. The diantimony pentoxide sol can be produced by known methods, for example, a method in which diantimony trioxide is oxidized, a method in which an alkali antimonate is dealkalized with ion exchange resin, a method in which sodium antimonate is treated with an acid, and/or the like. The hexaantimony tridecaoxide sol can be produced by a method in which diantimony trioxide is oxidized and the diantimony tetroxide hydrate sol can also be produced by a method in which diantimony trioxide is oxidized. The colloidal diantimony trioxide can be produced by a gas phase method in certain example instances.

In still further example embodiments of this invention, the UV coating 10 may be of or include any coating mentioned in U.S. Pat. No. 6,649,212, the disclosure of which is hereby incorporated herein by reference. For example, the UV blocking coating may comprise a UV-radiation absorbing compound, comprising: alternating repeat units of: (1) a first monomer derived from a compound having the general formula: $(CH_2OCHCH_2)$—$R_z$—$[(R_a(OR)_b$—Si—O—Si—$R_a$(OR)$_b$)]$_c$—$R_z$—$(CH_2OCHCH_2)$ wherein $(CH_2OCHCH_2)$ is an epoxy group, $R_z$ is an organic group bonded to a siloxane silicon atom and epoxy groups, $R_a$ is an organic group bonded to a silicon atom and comprises from one to six carbon atoms, $(OR)_b$ is an alkoxy-group wherein R is an organic radical having from one to six carbon atoms, a and b are each at least one, a+b are equal to 3, and c represents the number of Si—O—Si repeat units and is at least 1, and (2) a second monomer derived from an UV-absorbing aromatic compound having at least two aromatic hydroxyl groups reactive with epoxy groups on said first monomer. In certain example instances, the second monomer may be a di-, tri-, or tetrafunctional hydroxybenzophenone. In certain example instances, the second monomer may be 2,2' dihydroxybenzophenone or 2,2'-4,4' tetrahydroxybenzophenone.

In still further example embodiments of this invention, the UV blocking coating 10 may be of any type discussed in U.S. Ser. No. 10/922,235, the disclosure of which is hereby incorporated herein by reference. For instance, there may be provided a UV blocking coating that allows for relatively lower temperature cross-linkage reactions between a UV-absorbent compound and an epoxy alkoxysilane. More specifically, UV-absorbent coatings on transparent substrates are formed by prepolymerizing a mixture consisting essentially of a hydroxy-benzophenone, an epoxyalkoxysilane and an organic catalyst at an elevated temperature of between about 40° C. to about 130° C. and for a time sufficient such that between about 30 to about 70% of the epoxyalkoxysilane moieties form ring-opened oligomers and polymers with degrees of polymerization of between about 2 to about 2000, and more preferably between about 2 to 200. Such prepolymerized mixture may then be coated onto the surface of a transparent substrate. Most preferably, the prepolymerized mixture is hydrolyzed prior to being coated onto the substrate in an alcoholic acidic solution. For example, as a UV-absorbent compound there is tetrahydroxybenzophenone. An example epoxyalkoxysilane is 3-glycidoxypropyl trimethoxysilane (sometimes hereinafter referenced more simply as "glymo"). It may be possible that prepolymerization be effected in the presence of a tertiary amine such as triethylamine (TEA) as the organic catalyst which is only one of many possible amine catalysts that one practiced in the art will recognize. In addition, it is also possible to use a basic alkoxide, ROM where M is an alkali metal or alkaline earth metal and RO is any suitable, soluble organic that will react with the glymo epoxy ring or with the $RSi(OR)_3$ group. Likewise, it is possible to use species such as $R_4NOH$ and $R_4POH$ as catalysts for the ring-opening oligomerization or polymerization of the epoxy group on glymo.

In other example embodiments of this invention, the UV blocking coating 10 may be of or include a resin composition including a blend of silanols, colloidal silica, an ultraviolet-absorbing material, and optionally a dye. The silanol(s) may include a silanol from the group having the formula $R_wSi(OH)_x$ or $R_ySi(OR')_z$ where (w+x) or (y+z)=4, and R and R' may be organic radicals possibly without any crosslinking sites, silanol from the group having the formula $R''Si(OR''')_3$ where R" is a hydrogen atom or an organic radical and R''' is an organic radical containing a crosslinking site. The UV absorbing material may be, for example, benzophenone, a benzotriazole, and/or a benzothiazole. A process of forming the resin composition for the UV coating may include reacting the silanols and the UV absorbing material under agitation for many hours. Further example details as to such UV coatings may be found in U.S. Pat. No. 5,371,138, the disclosure of which is incorporated herein by reference.

Figure 4:
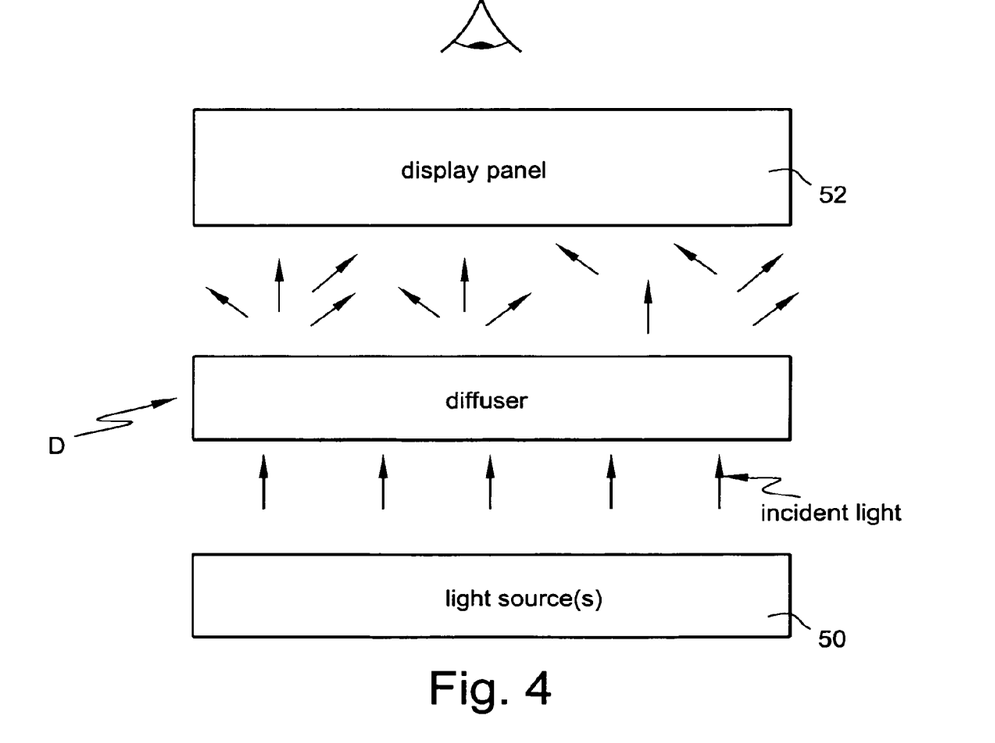
FIG. 4 is a cross sectional schematic diagram of any of the diffusers herein used in an example display application.

FIG. 4 illustrates an example embodiment of this invention, where any diffuser D discussed above (e.g., see any of FIGS. 1-3 and 5) is used in an illumination system of a display such as a liquid crystal display. The illumination system includes a light source(s) 50 for directing collimated or non-collimated light toward the diffuser D. The light from the source(s) 50 is considered incident light on the diffuser D. The light from the source(s) 50 includes both visible and UV radiation, and possible IR radiation. The diffuser D (see any of FIGS. 1-3 and 5) scatters/spreads the visible light from the light source(s) 50 and causes a significant amount of the UV radiation from the source(s) 50 to be blocked. Thus, the light which makes its way from the diffuser D toward the display panel 52 has less UV radiation therein and is diffuse in nature.

EXAMPLES 1-10

Examples 1-8 are for purposes of example only and without limitation. In each of Examples 1-8, a UV blocking coating 10 was formed on a glass substrate. In Examples 1-6, the UV blocking coating 10 was formed directly on the glass substrate; whereas in Examples 7-8 another coating as indicated was formed between the glass substrate and the UV blocking coating 10 so that the coating 10 was formed indirectly on the glass substrate (i.e., the word "on" as used herein is not limited to directly on, but also includes indirectly on with other things in between).

Figure 6:
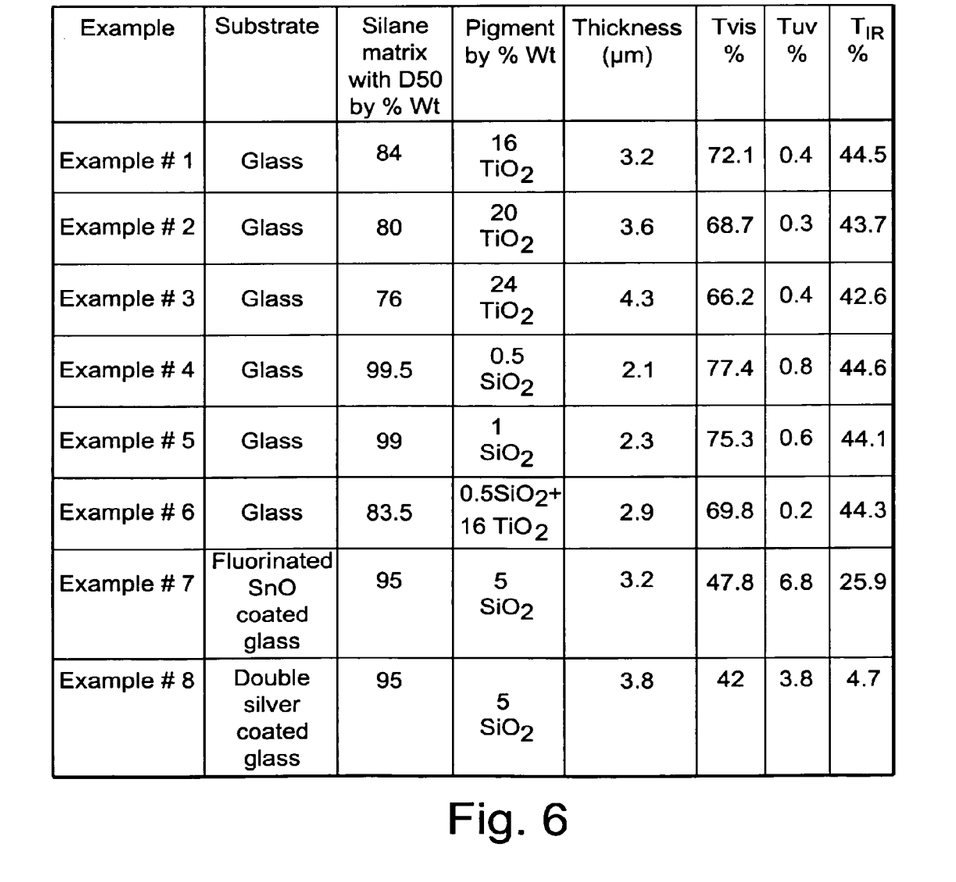
FIG. 6 illustrates the make-up of UV blocking coatings of Examples 1-8 according to different examples of the instant invention.

FIG. 6 is a chart illustrating Examples 1-8. These Examples are based on the FIG. 5 embodiment. In each of these Examples, an organic matrix based on silane was used for the UV blocking coating 10, on a glass substrate. In Example 1 for example, the $TiO_2$ particles (16% by weight in Example 1) perform the visible light diffusing function whereas the silane matrix with D50 performs the UV blocking function. Note that D50 is an organic UV blocker, made up of 2,2,4,4 tetra hydroxyl Benzo Phenone. The thickness in FIG. 6 indicates the thickness of the coating 10, Tvis indicates the visible transmission of the diffuser D, Tuv indicates the UV transmission of the diffuser D, and $T_{IR}$ indicates the infrared (IR) transmission of the diffuser D in each respective example.

Figure 8:
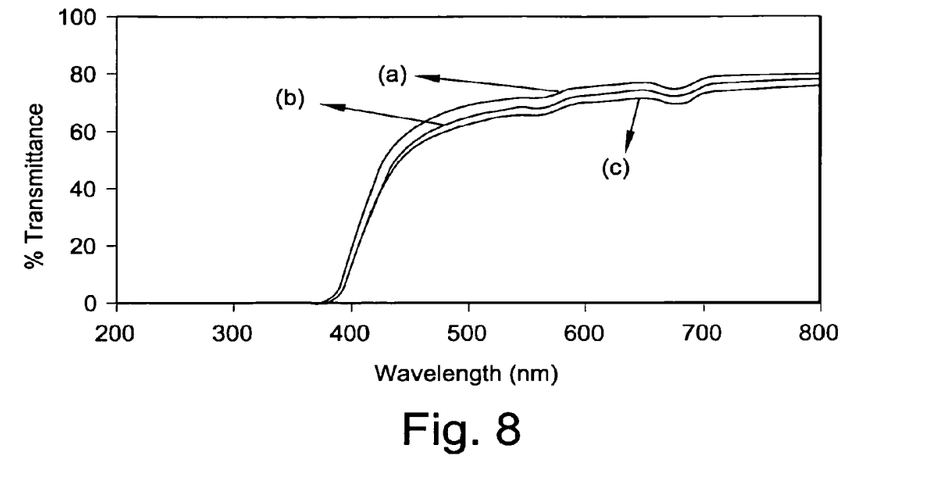
FIG. 8 is a graph illustrating the transmission vs. wavelength characteristics of coatings of Examples 1-3.
Figure 9:
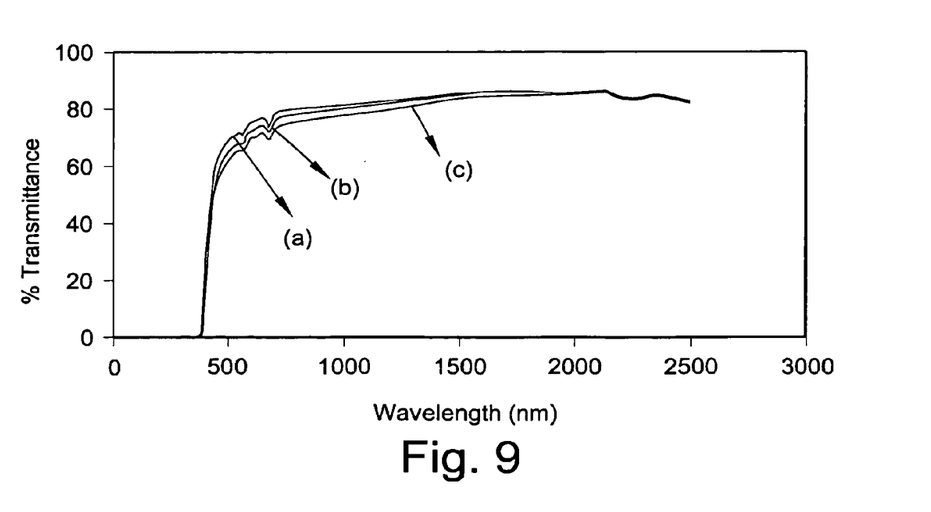
FIG. 9 is a graph illustrating the transmission vs. wavelength characteristics of coatings of Examples 1-3.

FIGS. 8-9 are graphs illustrating the transmission vs. wavelength characteristics of the coatings of Examples 1-3. FIG. 8 illustrates mainly UV spectrum and visible, whereas FIG. 9 illustrates a broader spectrum of wavelengths including the UV-IR spectrum including visible. In particular, in FIGS. 8-9 the curves marked (a) indicate Example 1, the curves marked (b) indicate Example 2, and the curves marked (c) indicate Example 3. Thus, these figures illustrate the UV spectra of coatings having organic matrix with titania dispersion in percent by weight (a) 16%, (b) 20%, and (c) 24%. D50 was the organic UV blocker in the matrix. Note that the diffuser with the smallest titania amount (a) had the highest transmission, but that all had good UV blocking characteristics in the UV range (300-380 nm).

Figure 10:
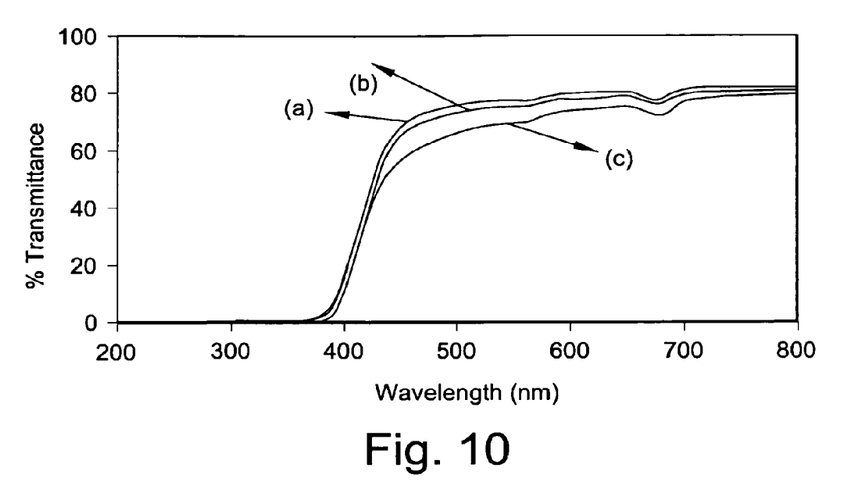
FIG. 10 is a graph illustrating the transmission vs. wavelength characteristics of coatings of Examples 4-6.
Figure 11:
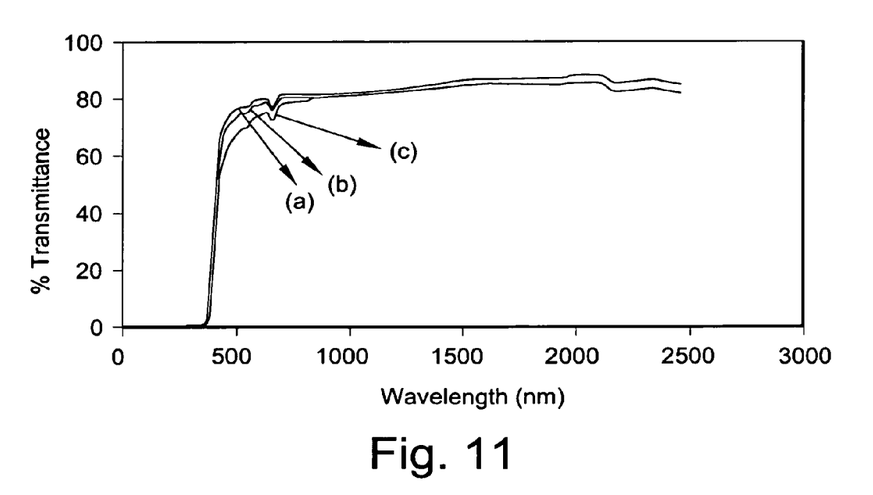
FIG. 11 is a graph illustrating the transmission vs. wavelength characteristics of coatings of Examples 4-6.

FIGS. 10-11 are graphs illustrating the transmission vs. wavelength characteristics of the coatings of Examples 4-6. FIG. 10 illustrates mainly UV spectrum and visible, whereas FIG. 11 illustrates a broader spectrum of wavelengths including the UV-IR spectrum including visible. In particular, in FIGS. 10-11 the curves marked (a) indicate Example 4 (0.5%

SiO$_2$ for diffusing particles), the curves marked (b) indicate Example 5 (1.0% SiO$_2$ for diffusing particles), and the curves marked (c) indicate Example 6 (0.5% SiO$_2$ and 16% TiO$_2$ for diffusing particles). Again, D50 was the organic UV blocker in the matrix. It can be seen in FIGS. 10-11 that good UV blocking was achieved for UV wavelengths (300-380 nm).

Figure 7:
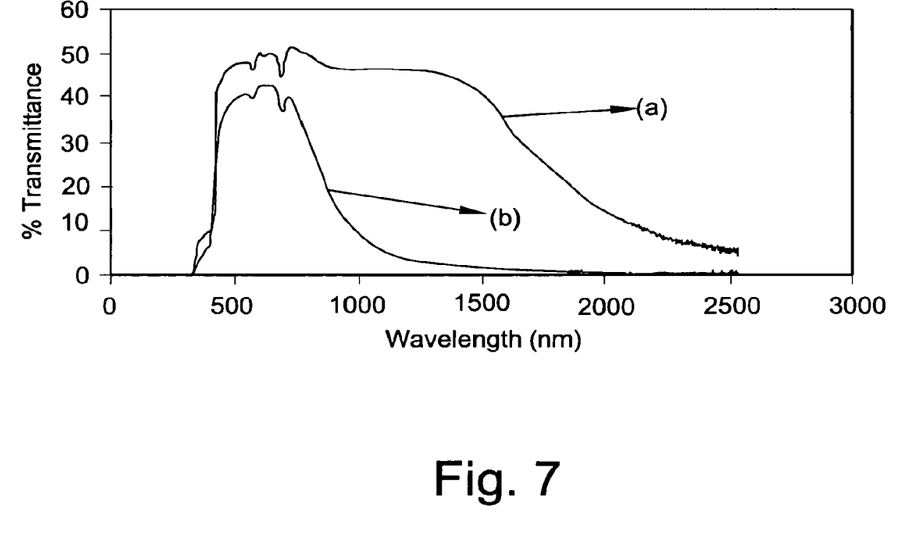
FIG. 7 is a graph illustrating the transmission vs. wavelength characteristics of a coating of Examples 7-8.
Figure 12:
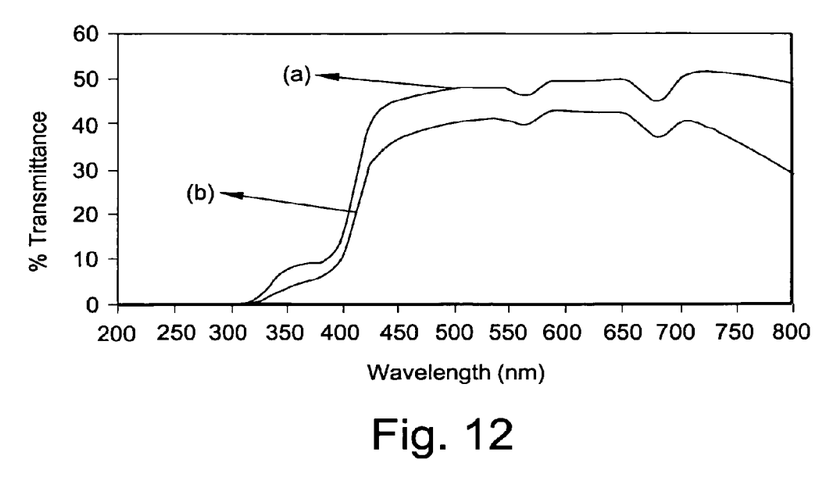
FIG. 12 is a graph illustrating the transmission vs. wavelength characteristics of coatings of Examples 7-8.

FIGS. 12 and 7 are graphs illustrating the transmission vs. wavelength characteristics of Examples 7-8. FIG. 12 illustrates the UV and visible wavelengths, and FIG. 7 illustrates the broader range of wavelengths including IR. In Example 7, the glass substrate was initially coated with a fluorinated tin oxide coating. Thereafter, the UV blocking coating 10 was applied on the substrate over the tin oxide coating in Example 7. In Example 8, the glass substrate was coated with a double-silver low-e coating. Thereafter, the UV blocking coating 10 was applied on the glass substrate over the low-E coating in Example 8. The UV blocking coating was the same in Examples 7-8, and as shown in FIG. 6, included 5% SiO$_2$ particles for visible light diffusion in a silane matrix including organic UV blocker D50. The visible transmission of the diffuser D of Example 7 (47.8%) and Example 8 (42%) was less than the visible transmission of Examples 1-6 due to the tin oxide layer in Example 7 and the low-E coating in Example 8.

It will be appreciated that in certain example embodiments of this invention, the diffuser D (or the UV blocking coating 10) has a T$_{uv}$ (UV transmission) (i.e., from 300-380 nm) of no more than about 50%, more preferably no more than about 30%, even more preferably no more than about 20%, still more preferably no more than about 10%, even more preferably no more than about 5% (or 2%), and most preferably no more than about 1%. This is shown in FIGS. 6-12 for example. Moreover, in certain example embodiments of this invention, the diffuser D (or the UV blocking coating 10) has a visible transmission (Tvis) of at least about 40%, more preferably of at least about 60%, even more preferably of at least about 70%, and sometimes at least about 75%. This is shown for example in FIGS. 6-12. In certain example embodiments of this invention, the diffuser D has an IR transmission of no more than about 50%, more preferably no more than about 45%.

In certain example embodiments of this invention, the particles make up by weight from about 0.1 to 35% of the UV blocking coating, more preferably from about 0.5 to 25% of the UV blocking coating, and even more preferably from about 1 to 20% of the UV blocking coating. For example, see FIG. 6.

Figure 13:
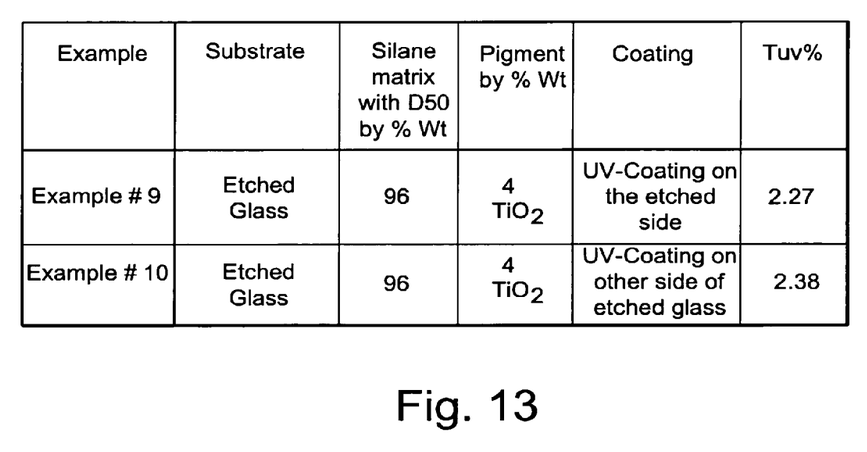
FIG. 13 illustrates the make-up of UV blocking coatings of Examples 9-10 according to different examples of the instant invention, where the UV blocking coating was formed on an etched (roughened) glass substrate (in Example 9 the UV blocking coating was formed directly on the etched surface of the glass substrate, whereas in Example 10 the UV blocking coating was formed on the side of the glass substrate, not etched, opposite that of the etched surface).

Example 9 relates to the FIG. 2 embodiment, whereas Example 10 relates to the FIG. 3 embodiment (e.g., see FIG. 13). FIG. 13 illustrates the make-up of UV blocking coatings of Examples 9-10 according to different examples of the instant invention, where the UV blocking coating was formed on an etched (roughened) glass substrate (in Example 9 the UV blocking coating was formed directly on the etched surface of the glass substrate, whereas in Example 10 the UV blocking coating was formed on the side of the glass substrate, not etched, opposite that of the etched surface).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An illumination system comprising:
    a light source for emitting light, the light emitted from the light source including at least visible light and ultraviolet (UV) radiation;
    a diffuser positioned so as to receive light from the light source,
    the diffuser diffusing visible light received from the light source; and
    wherein the diffuser comprises a glass substrate that supports a UV blocking coating so that the diffuser has a T$_{UV}$ (UV transmission) of no greater than about 5%;
    wherein the UV blocking coating is located on an etched surface of the glass substrate and comprises an organic UV blocking material in a silane-based matrix and includes particles in the matrix, the particles diffusing incident visible light from the light source, said particles consisting of TiO$_2$ particles and SiO$_2$ particles, and wherein the particles make up by weight from about 1 to 20% of the UV blocking coating, and wherein there is more TiO$_2$ than SiO$_2$ by weight.

2. The illumination system of claim 1, wherein the diffuser has a T$_{UV}$ of no greater than about 2%.

3. The illumination system of claim 1, wherein the diffuser has a T$_{UV}$ of no greater than about 1%.

4. The illumination system of claim 1, wherein the UV blocking material comprises 2, 2, 4, 4 tetra hydroxyl benzo phenone.

5. The illumination system of claim 1, wherein the UV blocking coating is in direct contact with the glass substrate.

6. An illumination system comprising:
    a light source for emitting light, the light emitted from the light source including at least visible light and ultraviolet (UV) radiation;
    a diffuser positioned so as to receive light from the light source,
    the diffuser diffusing visible light received from the light source; and
    wherein the diffuser comprises a glass substrate that supports a UV blocking coating so that the diffuser has a T$_{UV}$ (UV transmission) of no greater than about 5%;
    wherein the UV blocking coating is located on an etched surface of the glass substrate and comprises an organic UV blocking material in a silane-based matrix and includes particles in the matrix, the particles diffusing incident visible light from the light source, said particles consisting essentially of TiO$_2$ particles and SiO$_2$ particles, and wherein the particles make up by weight from about 1 to 20% of the UV blocking coating, and wherein there is more TiO$_2$ than SiO$_2$ by weight.

\* \* \* \* \*